(12) United States Patent
Barry et al.

(10) Patent No.: US 6,315,814 B1
(45) Date of Patent: Nov. 13, 2001

(54) GAS SEPARATION PLANT AND USE OF SUCH A PLANT FOR PRODUCING A GAS

(75) Inventors: Lionel Barry, Charenton le Pont; Patrice Goeler, Maisons Alfort, both of (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/441,454

(22) Filed: Nov. 17, 1999

(30) Foreign Application Priority Data

Nov. 17, 1998 (FR) .................................. 98 14402

(51) Int. Cl.⁷ .......................... B01D 53/22; B01D 53/047
(52) U.S. Cl. ................................. 95/24; 95/45; 95/130; 95/138; 96/4; 96/109; 96/117; 96/417
(58) Field of Search ..................... 95/24, 41, 45, 95/47–56, 130, 138; 96/4, 7–10, 109, 117, 128, 130, 135, 156, 245, 417–419

(56) References Cited

U.S. PATENT DOCUMENTS

| | | | |
|---|---|---|---|
| Re. 33,678 | * 9/1991 | Campbell et al. ............... 95/52 X |
| 4,881,953 | * 11/1989 | Prasad et al. ....................... 95/41 |
| 5,090,971 | * 2/1992 | Barbier ............................... 95/45 |
| 5,137,548 | * 8/1992 | Grenier et al. .................... 95/41 |
| 5,388,413 | 2/1995 | Major et al. ...................... 62/11 |
| 5,429,662 | * 7/1995 | Fillet ............................. 95/41 X |
| 5,507,855 | * 4/1996 | Barry ............................ 95/45 X |
| 5,582,030 | * 12/1996 | Dannöhl ....................... 95/47 X |
| 5,688,306 | 11/1997 | Verini ............................... 95/15 |
| 5,700,310 | * 12/1997 | Bowman et al. ................. 95/45 |
| 5,762,684 | * 6/1998 | Hayashi et al. .................. 95/24 |
| 5,792,237 | * 8/1998 | Hung et al. ....................... 95/24 |

FOREIGN PATENT DOCUMENTS 2 222 535  3/1990 (GB) .

* cited by examiner

*Primary Examiner*—Robert H. Spitzer
(74) *Attorney, Agent, or Firm*—Young & Thompson

(57) ABSTRACT

A gas separation plant includes, downstream of the line for feeding the gas separation module with a compressed gas mixture, a liquid particle separation device which includes a liquid detector, for example, of the optronic type, delivering an output signal, connected to an alarm device and to a central control unit of the plant.

14 Claims, 1 Drawing Sheet

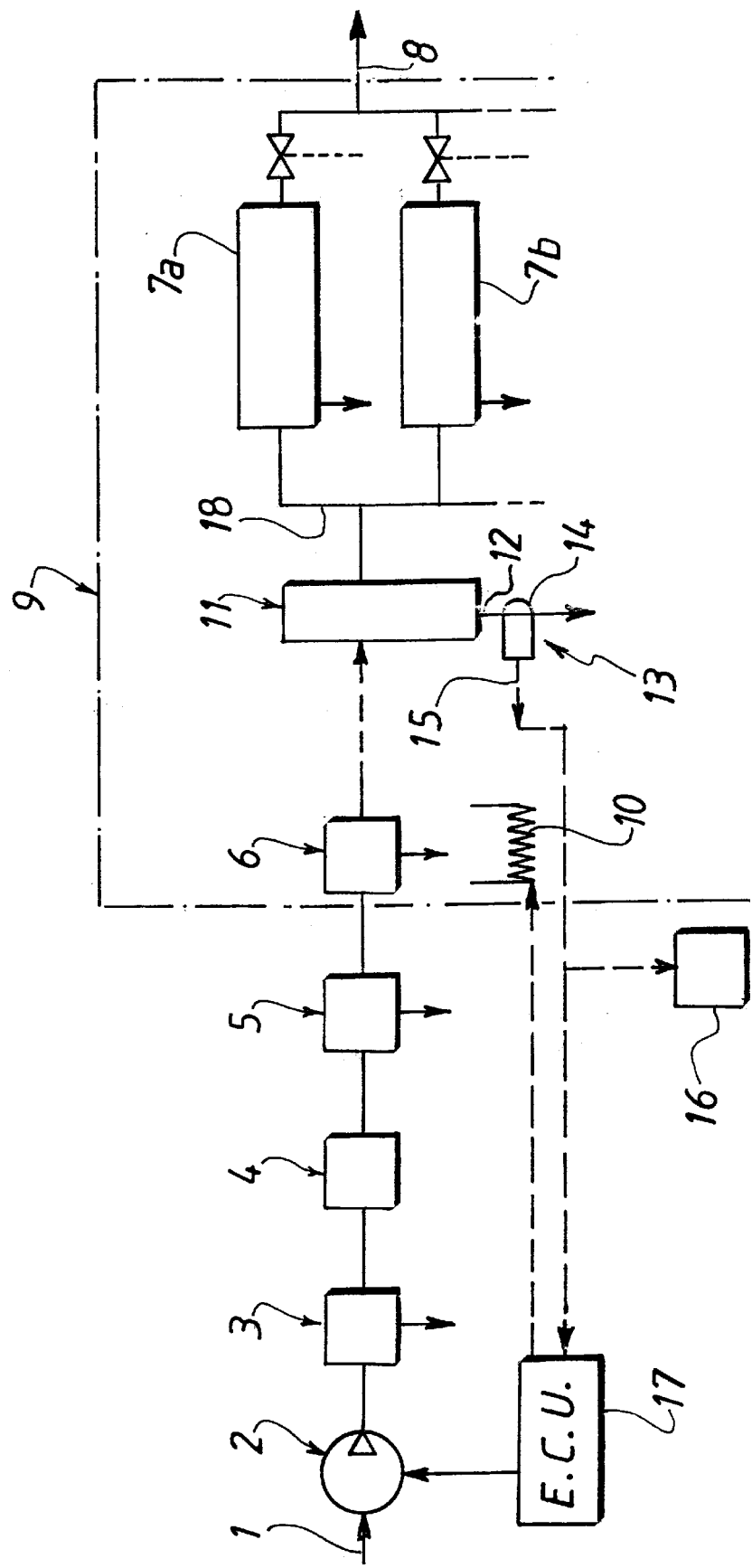

GAS SEPARATION PLANT AND USE OF SUCH A PLANT FOR PRODUCING A GAS

BACKGROUND OF THE INVENTION

The present invention relates to non-cryogenic gas separation plants, of the type comprising, in series, a unit for compressing a gas mixture to be separated, at least one device for separating possible liquid particles present in the gas mixture and at least one module for separating gases in the gas mixture.

An example of a plant of this type, employing a membrane separation module, is described in document EP-A-0,588,705 in the name of the Applicant.

It is known that the components of non-cryogenic separation modules which are fed with a gas mixture at temperatures above ambient temperature, whether adsorbent or permeation-membrane modules, are very sensitive to traces of impurities carried in the separated gas mixture, in particular in their liquid form. In order to prevent droplets of liquid reaching the modules, provision is made, as described for example in the abovementioned document, for there to be a complete system for treating the gas mixture to be separated, comprising, in practice, a series of dedicated filters and, in the case of membranes, heating at least downstream of the line supplying the separation module with the gas mixture. However, the existence of such a sophisticated system for treating the gas mixture does not make it possible to completely avoid accidental contamination of the separation modules with liquid, for example in the event of a puncture of an oil/air exchanger associated with the compressor, of anticipated saturation of a filter, or of a fault or maladjustment of the heating device, thereby generally resulting in having to rapidly replace the separation modules, with the corresponding direct and indirect costs.

SUMMARY OF THE INVENTION

The object of the present invention is to provide a plant of the aforementioned type which makes it possible, with simple, effective and inexpensive means, to avoid the abovementioned drawbacks.

To do this, according to one characteristic of the invention, the plant includes a liquid-particle separation device provided with a liquid detector.

According to other more particular characteristics of the invention:
 the liquid detector delivers an output signal that can be used to actuate an alarm system and/or a central control unit of the plant, on site and/or remotely;
 the liquid detector is of the optronic type;
 the liquid-particle separation device includes a purge and the liquid detector is connected to the purge;
 the filtration device provided with a liquid detector is a thin coalescence filter placed immediately upstream of the membrane module;
 the separation module is of the adsorption type;
 the separation module is of the permeation type.

The subject of the present invention is also the use of such a gas separation plant for producing at least one gas present in a gas mixture.

BRIEF DESCRIPTION OF THE DRAWINGS

Other characteristics and advantages of the present invention will emerge from the following description of one embodiment, given by way of illustration but implying no limitation, in relation to the appended drawing in which:

the single FIGURE shows schematically a gas separation plant, of the permeation-membrane type, according to the invention.

DETAILED DESCRIPTION OF THE PREFERRED EMBODIMENTS

The FIGURE shows a line for separating a gas mixture introduced at 1 into the inlet of a compression unit 2. The compressed gas mixture then passes in succession through a station 3 for separating any oil present in the compressed mixture, through a cooling station 4, into a water separation station 5, into a coalescer prefilter 6 before reaching a battery of parallel membrane modules 7a, 7b, etc., emerging in a production line 8 going to at least one user station (not shown). As described in the abovementioned document, at least the downstream part of the production line, including the membrane modules 7 and their feed manifold 18, is enclosed in at least one thermostatted enclosure 9 heated by integrated heating means 10 which are controlled, together with the compression unit and the valves of the plant, by a central control and monitoring unit 17.

Placed just upstream of the battery of membrane modules 7 in the embodiment of the invention shown is a filter 11 advantageously provided with a purge outlet 12 to which the fluid circuit of a liquid detector 13 is connected, this detector detecting any appearance of liquid droplets accumulating in the filter 11 and thus allowing action to be taken before these liquid droplets accumulate in the separation modules 7 and disturb their operation. As a variant, the liquid detector 13 may be placed near the lowest point of the manifold feeding the separation module or modules 7.

Advantageously, as shown in the single FIGURE, the liquid droplet detector 13 is of the optronic type with a detection dome 14 with internal signal reflection, the refractive index of which dome is modified by the appearance of a film of liquid on the external wall of the dome, as sold for example by Honeywell under the name Series LLN. This detector 13 delivers an output signal 15 making it possible to actuate, immediately or with a delay and confirmation of the wet state, at least one on-site alarm device 16, and typically an alarm responder device in the plant's telesurveillance centre, and looping back to the central control unit 17 and to the telesurveillance centre, in order to allow the compression unit 2 to be instantly cut off and the user station to be switched to a reserve source of production gas (not shown).

A preferred application of the above plant is in the production of a gas or a mixture of this gas with traces of other gases, from a gas mixture to be separated, typically for the production of impure nitrogen from a gas mixture consisting of atmospheric air or of process recovery gas. In this case, the downstream filtration device 11 associated with the liquid detector 13 will typically be a 0.01 $\mu$m grade coalescence filter placed entirely downstream of the filtration system.

Although the present invention has been described in relation to a particular embodiment and a particular use, it is not limited thereby but is capable of modifications and of variants that might occur to those skilled in the art within the context defined by the claims hereinbelow. In particular, it also relates to plants for gas separation by adsorption over adsorbent particulate materials in the form of thick layers or thin layers, especially of the pressure-swing type, called PSA, for purifying air or producing oxygen or hydrogen.

The liquid-particle separation devices may also be of the dynamic type, such as cyclones or those with a variation in the cross section of the gas feed pipe.

What is claimed is:

1. A method of separating a compressed gas mixture in at least one gas separation module, comprising the steps of:
   passing a compressed gas mixture to be separated through a gas-liquid separation device;
   detecting an appearance of liquid droplets in the device; and
   interrupting a supply of the gas mixture to the separation module upon detecting said appearance.

2. The method of claim 1, wherein the gas mixture is air.

3. The method of claim 1, wherein the detecting step is performed using a liquid-particle detector.

4. A non-cryogenic gas separating plant comprising, in series:
   a unit for compressing a gas mixture to be separated;
   at least one liquid-particle separation device for separating liquid particles in the gas mixture to be separated; and
   at least one gas separation module,
   wherein said liquid-particle separation device includes a liquid detector conFIGUREd for detecting an initial appearance of liquid droplets in said liquid-particle separation device and for generating an output signal upon detecting said appearance.

5. The plant according to claim 4, further comprising a central control unit for receiving said output signal.

6. The plant according to claim 4, further comprising an alarm system actuated by said output signal.

7. The plant according to claim 4, wherein said liquid detector is an optronic liquid detector.

8. The plant according to claim 4, wherein said liquid detector is located near a low point of a manifold feeding said at least one separation module with the gas mixture to be separated.

9. The plant according to claim 4, wherein said liquid-particle separation device is a coalescence filter connected immediately upstream of said at least one separation module.

10. The plant according to claim 4, wherein said liquid detector is connected to a purge outlet of said liquid-particle separation device.

11. The plant according to claim 4, wherein said gas separation module is a permeation membrane.

12. The plant according to claim 4, wherein said gas separation module is a gas adsorption separation module.

13. The plant according to claim 4, wherein said liquid detector is a liquid-particle detector.

14. The plant according to claim 13, wherein said liquid-particle detector is operatively connected to a compression unit cut-off controller, said cut-off controller being activated upon the detection of liquid-particles.

* * * * *